(No Model.)

H. DOLAN.
NUT LOCK.

No. 531,024. Patented Dec. 18, 1894.

Witnesses:
L. C. Hill
A. L. Hough

Inventor:
Henry Dolan,
by Franklin H. Hough
Atty.

UNITED STATES PATENT OFFICE.

HENRY DOLAN, OF MINERSVILLE, PENNSYLVANIA.

NUT-LOCK.

SPECIFICATION forming part of Letters Patent No. 531,024, dated December 18, 1894.

Application filed September 28, 1894. Serial No. 524,382. (No model.)

*To all whom it may concern:*

Be it known that I, HENRY DOLAN, a citizen of the United States, residing at Minersville, in the county of Schuylkill and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut locks which are designed to be used particularly in railway construction for securing the fish plates to the rails, and holding the same against any possible loosening from any strain caused by passing trains.

My invention pertains to the class commonly called ratchet washer nut locks, and I provide a spring designed to pass over the bolt and to bear between the fish plate and the under side of the lower ratchet washer, through the agency of which the serrated faces of the two washers will be kept together in case of any contraction or expansion of the parts, which would be likely otherwise to loosen the fish plates. When the ratchet washers and spring are secured in place on the bolt and the nut screwed thereon, a retaining cap is placed over the nut and is retained thereon by means of a washer having arms which are brought up through between the said cap and nut and bent over the edge of the cap, thus securely holding the same in place.

To these ends and to such others as the invention may pertain, the same consists further in the novel construction, combination and adaptation of the parts as will be hereinafter more fully described and then specifically defined in the appended claims.

I clearly illustrate my invention in the accompanying drawings, which with the letters of reference marked thereon form a part of this specification, similar letters of reference indicating like parts, and in which—

Figure 1:
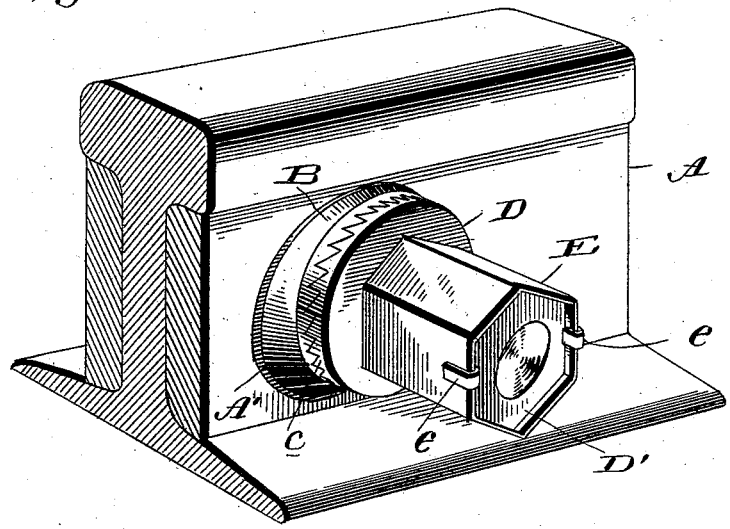
Figure 3:
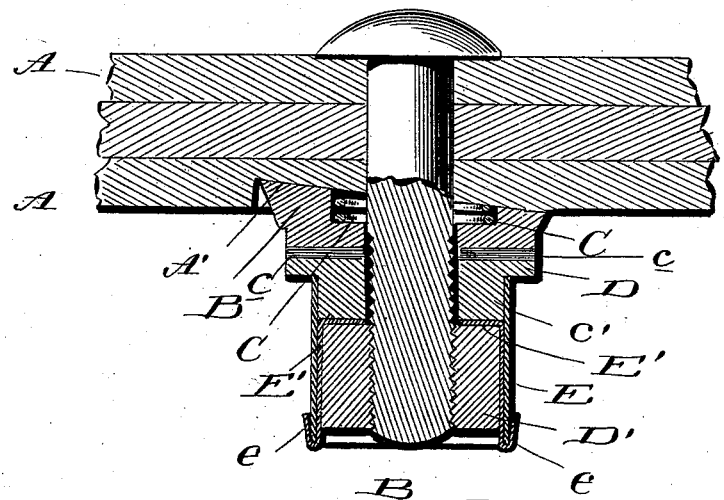
Figure 2:
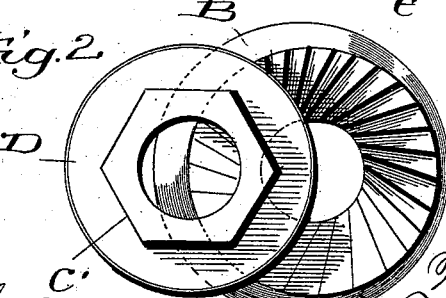

Figure 1 is a perspective view of the nut lock as applied to a bolt and fish plate; Fig. 2, a plan view of the ratchet washers and Fig. 3, is a vertical sectional view through the nut cap, washers and bolt.

Reference now being had to the details of the drawings by letter, A designates the ordinary fish plates used in connection with railways, and are recessed at A' for the reception of the beveled ratchet washer B, the under surface of which is recessed out for the reception of the spring C.

D is a second washer having the toothed surface c, and hexagonal shoulder c', and D' the nut corresponding in shape and size to the shoulder c', and E is a cap designed to engage over the nut and said shoulder, thus preventing the nut's turning independently of the upper washer. A single beveled washer with a shoulder, would ordinarily answer the purpose and could be substituted for the two ratchet washers, but oftentimes it might occur that, in tightening the nut, it would not come in line to slip a tight fitting cap over, and a double washer as described is preferably employed.

The washer E', with its integral arms e e, is placed over the bolt on the upper face of the ratchet washer D, the nut screwed on the bolt, and the integral arms bent up, the cap E placed over the nut, the upturned arms and the shoulder of the washer D, and then the free ends of the arms e are bent over the upper edge of the cap, thus securely holding the same in place. When the cap E is placed over the nut and shoulder of the washer D, the two ratchet faces of the washers, having their teeth interlocking, will prevent any possible backward turning of the washer D which carries the cap E, and which might otherwise, were it not for the ratchet faces engaging each other, become loosened, and allow the cap to turn with the nut. The provision of the spring serves to keep the teeth of the washers together, under any conditions caused by expansion or contraction of the parts.

What I claim is—

1. A nut lock comprising the serrated washers and the spring as described carried on a bolt used in connection with a fish plate, combined with a nut and a cap designed to engage with the said nut, and a shoulder on the washer D for locking the nut to the washer, substantially as shown and described.

2. A nut lock as described, composed of the washers B and D combined with the fish plate, bolt and nut, the retaining cap E and the washer E' for holding the said cap in a locked relation, substantially as shown and described.

3. In a nut lock, the washer B beveled and designed to be seated in a recess in a fish plate, said recess being inclined, the washer D combined with the spring, the nut, cap and washer with integral arms designed to hold the said cap to the shoulder of the washer D, all substantially as shown and described.

In testimony whereof I affix my signature in presence of two witnesses.

HENRY DOLAN.

Witnesses:
WM. DEMPSEY,
M. J. WARD.